United States Patent
Sharifi et al.

(10) Patent No.: US 12,298,985 B2
(45) Date of Patent: *May 13, 2025

(54) MAPPING IMAGES TO SEARCH QUERIES

(71) Applicant: Google LLC, Mountain View, CA (US)

(72) Inventors: Matthew Sharifi, Kilchberg (CH); Abhanshu Sharma, Zürich (CH); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,509

(22) Filed: Jun. 29, 2023

(65) Prior Publication Data
US 2023/0350905 A1 Nov. 2, 2023

Related U.S. Application Data

(63) Continuation of application No. 17/676,615, filed on Feb. 21, 2022, now Pat. No. 11,734,287, which is a
(Continued)

(51) Int. Cl.
*G06F 16/2457* (2019.01)
*G06F 16/2452* (2019.01)
(Continued)

(52) U.S. Cl.
CPC .. *G06F 16/24578* (2019.01); *G06F 16/24522* (2019.01); *G06F 16/583* (2019.01); *G06F 16/5866* (2019.01); *G06F 16/90335* (2019.01)

(58) Field of Classification Search
CPC ......... G06F 16/24578; G06F 16/24522; G06F 16/583; G06F 16/5866; G06F 16/90335; G06F 16/532; G06F 16/538
See application file for complete search history.

(56) References Cited

U.S. PATENT DOCUMENTS 6,556,710 B2   4/2003   Pass et al.
7,565,139 B2   7/2009   Never, Sr. et al.
(Continued)

FOREIGN PATENT DOCUMENTS

WO   WO 2013/066571   5/2013

OTHER PUBLICATIONS

International Preliminary Report on Patentability for Application No. PCT/US2016/064626, mailed on Jul. 4, 2018, 17 pages.
(Continued)

*Primary Examiner* — Angelica Ruiz
(74) *Attorney, Agent, or Firm* — DORITY & MANNING P.A.

(57) ABSTRACT

Methods, systems, and apparatus for receiving a query image, receiving one or more entities that are associated with the query image, identifying, for one or more of the entities, one or more candidate search queries that are pre-associated with the one or more entities, generating a respective relevance score for each of the candidate search queries, selecting, as a representative search query for the query image, a particular candidate search query based at least on the generated respective relevance scores and providing the representative search query for output in response to receiving the query image.

20 Claims, 3 Drawing Sheets

Related U.S. Application Data continuation of application No. 16/657,467, filed on Oct. 18, 2019, now Pat. No. 11,269,897, which is a continuation of application No. 15/131,178, filed on Apr. 18, 2016, now Pat. No. 10,489,410.

(51) Int. Cl.
*G06F 16/58* (2019.01)
*G06F 16/583* (2019.01)
*G06F 16/903* (2019.01)

(56) References Cited

U.S. PATENT DOCUMENTS

| | | | |
|---|---|---|---|
| 8,209,330 B1 | 6/2012 | Covell | |
| 8,429,173 B1 | 4/2013 | Rosenberg et al. | |
| 9,053,115 B1* | 6/2015 | Rosenberg | G06F 16/583 |
| 9,092,485 B2 | 7/2015 | Rubinstein et al. | |
| 9,830,391 B1 | 11/2017 | Bakir et al. | |
| 9,940,382 B2 | 4/2018 | Barbieri et al. | |
| 11,269,897 B2* | 3/2022 | Sharifi | G06F 16/24522 |
| 11,734,287 B2* | 8/2023 | Sharifi | G06F 16/24578 |
| | | | 707/728 |
| 2007/0174872 A1* | 7/2007 | Jing | G06F 16/951 |
| | | | 725/35 |
| 2009/0100050 A1 | 4/2009 | Erol et al. | |
| 2010/0070523 A1 | 5/2010 | Delgo et al. | |
| 2011/0035406 A1 | 2/2011 | Petrou et al. | |
| 2011/0176724 A1* | 7/2011 | Yang | G06F 18/21375 |
| | | | 382/190 |
| 2013/0117258 A1 | 5/2013 | Linsley et al. | |
| 2014/0019484 A1 | 1/2014 | Coppin et al. | |
| 2014/0046935 A1 | 2/2014 | Bengio et al. | |
| 2014/0185941 A1 | 7/2014 | Li et al. | |
| 2014/0201027 A1* | 7/2014 | Bhardwaj | G06F 16/583 |
| | | | 705/26.7 |
| 2015/0039583 A1 | 2/2015 | Liu et al. | |
| 2015/0052121 A1* | 2/2015 | Sharifi | G06F 16/955 |
| | | | 707/723 |
| 2015/0169754 A1 | 6/2015 | Gu et al. | |
| 2015/0169991 A1 | 6/2015 | Zhang et al. | |
| 2016/0140147 A1 | 5/2016 | Sun | |

OTHER PUBLICATIONS

International Search Report and Written Opinion for Application No. PCT/US2016/064626, mailed on Mar. 6, 2017, 22 pages.

Zhang et al., "Image Retrieval Method Using Visual Query Suggestion and Relevance Feedback.", 2012 International Conference on Wireless Communications and Signal Processing, Oct. 25, 2012, 6 pages.

* cited by examiner

MAPPING IMAGES TO SEARCH QUERIES

CROSS-REFERENCE TO RELATED APPLICATIONS

This application is a continuation application of, and claims priority to, U.S. patent application Ser. No. 17/676,615, titled "MAPPING IMAGES TO SEARCH QUERIES," filed on Feb. 21, 2022, which is a continuation application of, and claims priority to, U.S. patent application Ser. No. 16/657,467, titled "MAPPING IMAGES TO SEARCH QUERIES," filed on Oct. 18, 2019, which is a continuation application of, and claims priority to, U.S. patent application Ser. No. 15/131,178, titled "MAPPING IMAGES TO SEARCH QUERIES," filed on Apr. 18, 2016. The disclosure of the foregoing applications are incorporated herein by reference in its entirety for all purposes.

TECHNICAL FIELD

This specification relates to search engines.

BACKGROUND

In general, a user can request information by inputting a query to a search engine. The search engine can process the query and can provide information for output to the user in response to the query.

SUMMARY

A system can receive a query image, e.g., a photograph from a user's surroundings. In response to receiving the query image, the system annotates the query image with one or more query image labels, e.g., query image labels that tag features in the query image. The query image labels tag coarse-grained features of the query image and, in some cases, fine-grained features of the query image. Based on the query image labels, the system identifies one or more entities associated with the query image labels, e.g., people, places, television networks or sports clubs, and identifies one or more candidate search queries using the identified one or more entities. The system uses the identified entities and query image labels to bias the scoring of candidate search queries towards those that are relevant to the user, independent of whether the query image is tagged with fine grained labels or not. The system provides one or more relevant representative search queries for output.

Innovative aspects of the subject matter described in this specification may be embodied in methods that include the actions of receiving a query image, receiving one or more entities that are associated with the query image, identifying, for one or more of the entities, one or more candidate search queries that are pre-associated with the one or more entities, generating a respective relevance score for each of the candidate search queries, selecting, as a representative search query for the query image, a particular candidate search query based at least on the generated respective relevance scores and providing the representative search query for output in response to receiving the query image.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations generating a respective relevance score for each of the candidate search queries comprises, for each candidate search query: determining whether a context of the query image matches the candidate search query; and based on the determined match, generating a respective relevance score for the candidate search query.

In some implementations determining whether the context of the query image matches the candidate search query comprises determining whether the query image has an associated location that matches the candidate search query.

In some cases the method further comprises receiving a natural language query; and generating a respective relevance score for each of the candidate search queries based at least on the received natural language query.

In other cases the method further comprises generating a respective relevance score for each of the candidate search queries comprises, for each candidate search query: generating a search results page using the candidate search query; analyzing the generated search results page to determine a measure indicative of how interesting and useful the search results page is; and based on the determined measure, generating a respective relevance score for the candidate search query.

In some implementations generating a respective relevance score for each of the candidate search queries comprises, for each candidate search query: determining a popularity of the candidate search query; and based on the determined popularity, generating a respective relevance score for the candidate search query.

In other implementations receiving one or more entities that are associated with the query image comprises: obtaining one or more query image labels; and identifying, for one or more of the query image labels, one or more entities that are pre-associated with the one or more query image labels.

In some cases the one or more query image labels comprise fine-grained image labels.

In some cases the one or more query image labels comprise coarse-grained image labels.

In some implementations the method further comprises generating a respective label score for each of the query image labels.

In some implementations a respective label score for a query image label is based at least on a topicality of the query image label.

In other implementations a respective label score for a query image label is based at least on how specific the label is.

In further implementations a respective label score for a query image label is based at least on a reliability of a backend by which the query image label is obtained from and a calibrated backend confidence score.

In some cases selecting a particular candidate search query based at least on the candidate query scores further comprises selecting a particular candidate search query based at least on the candidate query scores and the label scores.

In some implementations selecting a particular candidate search query based at least on the candidate query scores and the label scores comprises: determining an aggregate score between each label score and associated candidate query score; ranking the determined aggregate scores; and selecting a particular candidate search query that corresponds to a highest ranked score.

In some cases selecting a particular candidate search query based at least on the candidate query scores comprises: ranking the relevance scores for the candidate search queries; and selecting a particular candidate search query that corresponds to a highest ranked score.

In some implementations providing the representative search query for output in response to receiving the query image further comprises providing a predetermined number of candidate search queries that correspond to the predetermined number of highest ranked scores for output in response to receiving the query image.

In other implementations the method further comprises generating a search results page using the representative search query; and providing the generated search results page for output in response to receiving the query image.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for generating text search queries using image-based queries. A system can receive an image-based query, e.g., a photo from a user's surroundings. The system combines a set of visual recognition results for the received image-based query with search query logs and known search query attributes to generate relevant natural language candidate search queries for the input image-based search query. The natural language candidate search queries are biased towards search queries that (i) match the user's intent, (ii) generate interesting or relevant search results pages, or (iii) are determined to be popular search queries.

In some implementations the system may receive an image-based search query together with a natural language query, e.g., text that may have been spoken and derived using speech recognition technology. The system may combine a set of visual recognition results for the received image-based search query with search query logs and known search query attributes to generate relevant natural language candidate search queries for the input image-based search query. The natural language candidate search queries are biased towards search queries that (i) match the user's intent, (ii) generate interesting or relevant search results pages, (iii) are determined to be popular search queries, and (iv) include or are associated with the received natural language query.

Figure 1:
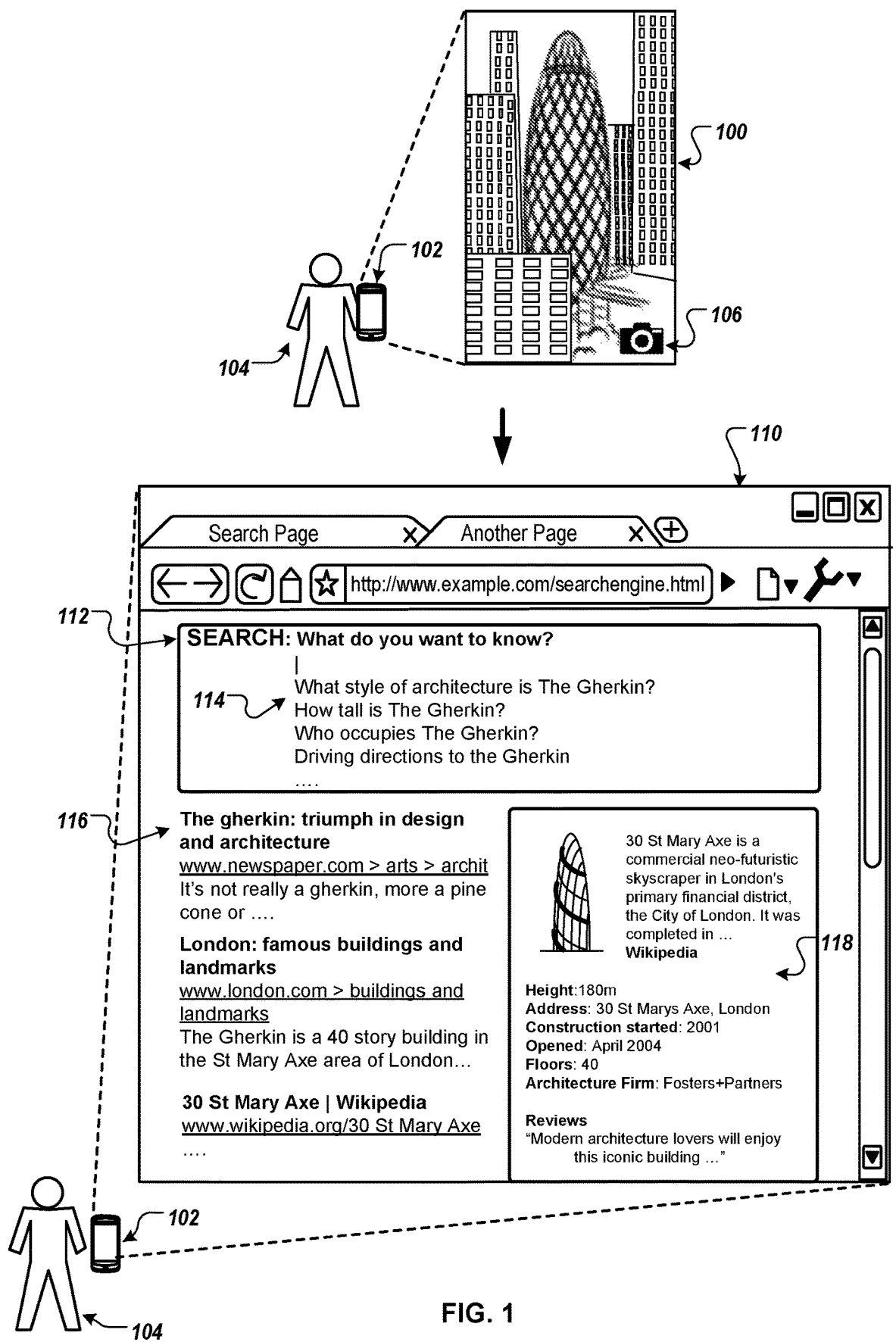
FIG. 1 depicts an example query image and an example search results page for the example query image.

FIG. 1 depicts an example query image 100 and an example search results page 110 for the example query image 100. For example, the example search results page 110 may be provided by a system in response to receiving and processing example query image 100.

The example query image 100 depicted in FIG. 1 is a representative photograph query image 106. For example, the photograph query image 106 may represent a photograph taken by a user 104 using a user device 102. In other examples the photograph query image 106 may represent a photograph received or otherwise accessed by a user 104 at the user device 102. In some implementations the example query image 100 may represent another type of image received, obtained or accessed by a user 104 at the user device 102. For example, the image may represent a thumbnail or other image found on a website accessed by the user device 102, or an image obtained from an application running on the user device 102.

The example query image 100 may include one or more image features. The one or more image features include image features that may be labeled by an image recognition system. For example, the query image 100 may include both coarse grained image features and fine grained image features. As an example, the query image 100 may include a picture of a book on a table. In such a case, a coarse grained feature of the query image 100 may be the book and a fine grained feature may be the title or genre of the book. In the example query image 100 depicted in FIG. 1, coarse grained query image features may include "city" or "buildings," and fine grained features may include "London" or "The Gherkin."

The query image 100 may further include one or more objects or features that may be labeled by an image recognition system as being large, e.g., taking up a proportionally high amount of surface area of the image, small, e.g., taking up a proportionally small amount of surface area of the image, or central, e.g., centered in the middle of the image. Continuing the example above, the query image 100 may include a picture of a book on a table. In such a case, a large image feature may be the table and a small image feature may be the book. Furthermore, the book may be a central image feature. In the example query image 100 depicted in FIG. 1, a large image feature may be the buildings, a small image feature may be a window or door of one of the buildings, and a central image feature may be the building "The Gherkin."

The example query image 100 may be received by user device 102 and processed using a system for providing a representative search query for output in response to receiving a query image, e.g., system 200 below in FIG. 2, to provide one or more candidate search queries for output. The example search results page 110 depicted in FIG. 1 is a representative search results page that includes one or more representative search queries 114 that may be displayed on user device 102 in response to receiving example query image 100.

The example search results page 110 includes a search box 112 in which a user may enter a search query. The search box may be configured to receive search queries input directly from a user, or may be configured to provide one or more representative search queries in response to receiving a search query image, e.g., query image 100. As depicted in FIG. 1, the search box includes four representative search queries "What style of architecture is The Gherkin?" "How tall is the Gherkin?" "Who occupies The Gherkin?" and "Driving directions to The Gherkin" that have been provided to the user device in response to receiving query image 100.

The example search results page 110 further includes a list of search results 116 and a knowledge panel 118. The knowledge panel 118 provides general information relating to the entity "The Gherkin," such as the size, age and address of the building. The knowledge panel has been provided for display in example search results page 110, for example in response to identifying the entity "The Gherkin" as an important or central feature of the example query image 100. The list of search results 116 provides search results responsive to the representative search query "What style of architecture is The Gherkin?" For example, when processing example query image 100 the system may have determined that the context of the example query image 100 matches the representative search query "What style of architecture is The Gherkin?", e.g., the user 104 of user device 102 may have advertently or inadvertently indicated an interest in architecture. Providing a representative search query for output in response to receiving a query image is described in more detail below with reference to FIGS. 2 and 3.

Figure 2:
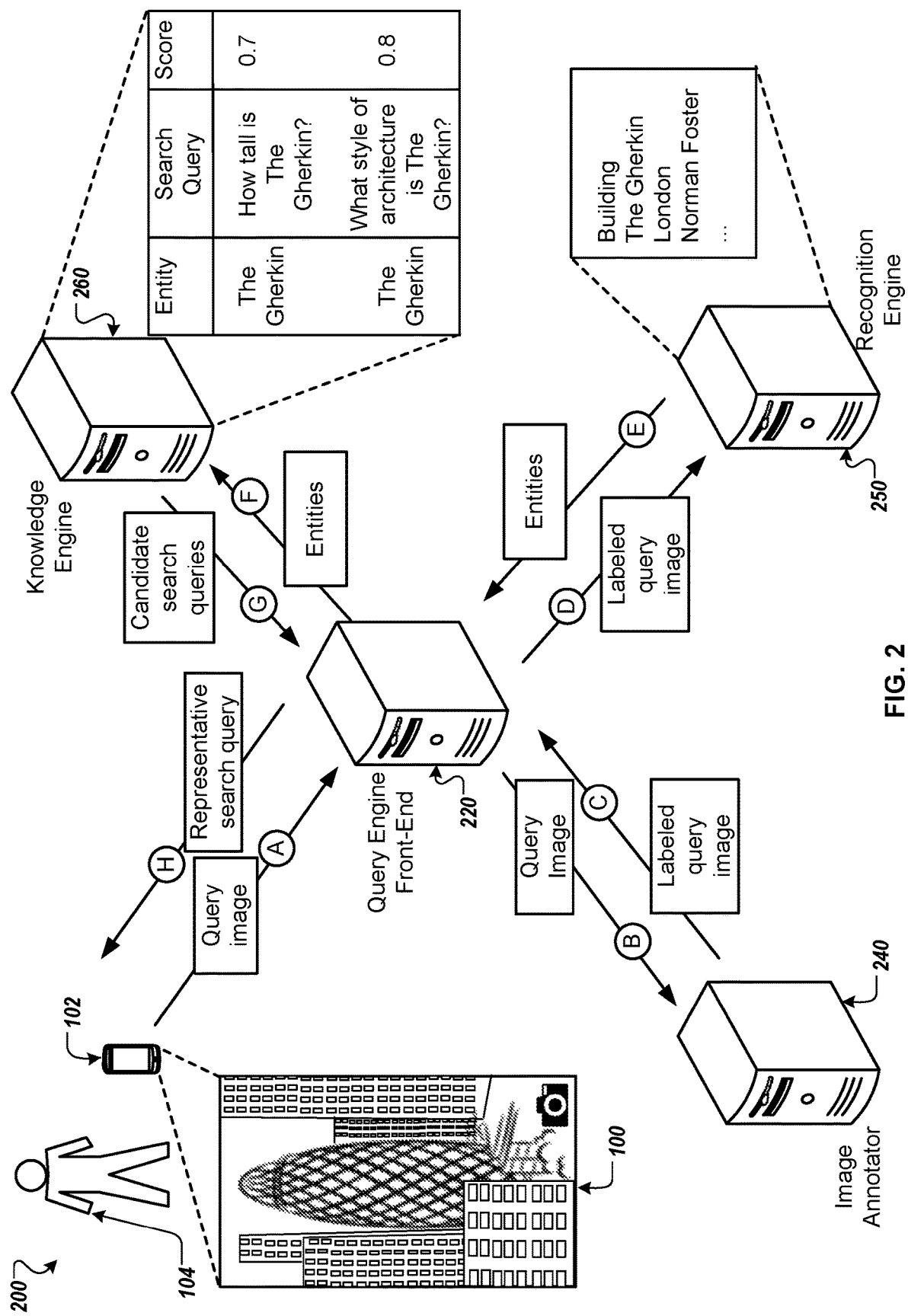
FIG. 2 depicts an example system for providing a representative search query for output in response to receiving a query image.

FIG. 2 depicts a system 200 for providing a representative search query for output in response to receiving a query image. Briefly, the system 200 can receive a query image, such as photograph taken and input by a user, and can receive one or more entities associated with the query image. The system 200 can identify one or more candidate search queries that are pre-associated with the one or more entities, generate respective scores for each of the candidate search queries and select a representative search query from the candidate search queries based on the generated scores. The representative search query can be provided for output to the user.

The system 200 includes a user device 202, query engine front-end 220, an image annotator 240, a recognition engine 250 and a knowledge engine 260. The components of the system 200 can each be in communication over one or more networks, such as one or more LAN or WAN, or can be in communication through one or more other wired or wireless connections.

During operation (A), the query engine front-end 220 receives data encoding a query image input by the user. For example, the user 204 can provide a photograph, e.g., photograph 206, as a query image at the user device 202 and data encoding the query image can be received by the query engine front-end 220. In some implementations, the query engine front-end 220 can receive the data encoding the user-input query image over one or more networks, or over one or more other wireless or wired connections.

The user device 202 can be a mobile computing device, such as a mobile phone, smart phone, personal digital assistant (PDA), music player, e-book reader, tablet computer, a wearable computing device, laptop computer, desktop computer, or other portable or stationary computing device. The user device 202 can feature a microphone, keyboard, touchscreen, or other interface that enables the user 204 to input a query at the device. In some implementations, the user 204 can provide the query at an interface that is presented or accessible from the user device 202. For example, the user 204 can enter the query at a search engine that is accessible at the user device 202, can enter the query at a database that is accessible at the user device 202, or can provide the query at any other interface that features search capabilities, e.g., at a social network interface.

The user 204 can provide a query at the user device 202 by selecting or submitting an image that the user would like to search for, or by providing a video sample of content that a user would like to search for. In some implementations, the user 204 can provide both a query image and a natural language query to the user device 202. The natural language query may be provided to the user device 202 by speaking one or more terms of a query. For example, the natural language query can be a spoken voice query input by a user by speaking into a microphone associated with user device 202. In such instances the system may obtain a transcription of the spoken voice query. For example, the user device may be associated with or have access to an automatic speech recognition (ASR) engine, and can obtain a transcription of the spoken voice query based on submitting the data encoding the spoken voice query to the ASR engine. In other examples the natural language query can provided to the user device by typing one or more terms of a query, selecting one or more terms of a search query, e.g., from a menu of available terms, selecting a query that comprises one or more terms, e.g., from a menu of available queries, or by providing a query using any other method. For example, the user 204 may provide user-input photograph 206 to the user device 202 together with the text "location" or "architecture."

Data that includes a query image input by the user 204 can be received by the query engine front-end 220 in a single data packet or in multiple data packets. The data associated with the user-input query image can further be received simultaneously, or can be received separately at different times.

Based on receiving the data encoding the query image input by the user, the query engine front-end 220 can transmit the data associated with the user-input query image to the image annotator 240. For example, based on receiving data that includes the user-input photograph 206 the query engine front-end 220 can extract the data associated with the user-input photograph 206 and can transmit data associated with the photograph to the image annotator 240.

During operation (B), the image annotator 240 can receive the data associated with the user-input query image and can identify one or more query image labels, e.g., visual recognition results, for the user-input query image. For example, the image annotator 240 may include or be in communication with one or more back ends that are configured to analyze a given query image and identify one or more query image labels. The image annotator 240 may identify fine grained query image labels, e.g., image labels that label specific landmarks, book covers or posters that are present in a given image, and/or coarse grained image labels, e.g., image labels that label objects such as table, book or lake. For example, based on receiving the data associated with user-input photograph 206, the image annotator may identify fine grained query image labels such as "The Gherkin," or "London" for the user-input photograph 206 and may identify coarse grained query image labels such as "Buildings," or "city." In some implementations image annotator 240 may return query image labels that are based on OCR or textual visual recognition results. For example, image annotator 240 may identify and assign a name printed on a street sign that is included in the query image, or the name of a shop that is included in the image, as query image labels.

In some implementations image annotator 240 may identify one or more query image labels for the user-input query image and generate a respective label score for each of the identified query image labels. The respective label scores for the query image labels may be based on a topicality of a label in the query image, e.g., how important a query image label is to the query image as a whole, or a measure of how specific the query image label is. For example, based on receiving the data associated with user-input photograph 206 and identifying the labels "Buildings," "City," "London," and "The Gherkin", image annotator 240 may generate a label score for the label "The Gherkin" that is higher than other label scores since The Gherkin is a central feature of the photograph 206. The respective label scores for the query image labels may also be based on a reliability of a back-end that identified the query image label and a calibrated backend confidence score, e.g., a score that indicates a back-end's confidence that a query image label is accurate. For example, a calibrated backend confidence score may be based on a back end's confidence that a query image label is accurate and may be adjusted based on a reliability of the back-end.

During operation (C), the image annotator 240 can transmit data associated with a labeled user-input query image, e.g., the user-input query image and any identified query image labels, to the query front-end 220. In some implementations the image annotator 240 further transmits data associated with any generated query image label scores. For example, based on receiving data that includes the user-input photograph 206 the image annotator 240 can identify the query image labels "Buildings," "City," "London," and "The Gherkin", and can transmit data associated with the photograph and the identified query image labels with respective label scores to the query front-end 220.

During operation (D), the recognition engine 250 can receive the data associated with the labeled user-input query image and can identify one or more entities associated with the labeled user-input query image. In some implementations, the recognition engine 250 can identify one or more entities associated with a labeled user-input query image by comparing the query image labels to terms associated with a set of known entities. For example, the labeled user-input query image received by the recognition engine 250 can include the coarse grained label "Buildings" and the recognition engine 250 can identify entities such as "Eiffel Tower," "Empire State Building," or "Taj Mahal" as being associated with the user-input query image based on comparing the query label "Buildings" to terms associated with a set of known entities. As another example, the labeled user-input query image received by the recognition engine 250 can include the fine grained label "The Gherkin" and the recognition engine 250 can identify entities such as "Norman foster," (architect) "Standard Life," (tenant) or "City of London" (location) as being associated with the user-input query image based on comparing the query label "The Gherkin" to terms associated with a set of known entities. In some implementations, a known set of entities can be accessible to the recognition engine 250 at a database, such as a database that is associated with the recognition engine 250 or that is otherwise accessible to the recognition engine 250, e.g., over one or more networks.

Based on identifying one or more entities associated with the labeled user-input query image, the recognition engine 250 can transmit data that identifies the entities and, if applicable, any additional context terms to the query engine front-end 220 during operation (E). In some implementations, the recognition engine 250 can additionally determine identifiers that are associated with the entities, and can transmit data that includes the entity identifiers to the query engine front-end 220 in addition to, or in lieu of, transmitting the data that identifies the entities. The recognition engine 250 can transmit the data identifying the entities and/or the entity identifiers to the query engine front-end 220 over one or more networks, or over one or more other wired or wireless connections.

During operation (F), the query engine front-end 220 can receive the data identifying the one or more entities, and can transmit the data identifying the entities to the knowledge engine 260. For example, the query engine front-end 220 can receive information identifying the entities "The Gherkin," "Norman foster," "Standard Life," and "City of London," and can transmit data to the knowledge engine 260 that identifies "The Gherkin," "Norman foster," "Standard Life," and "City of London." In some instances, the query engine front-end 220 can transmit the data identifying the entities to the knowledge engine 260 over one or more networks, or over one or more other wired or wireless connections.

As described above with reference to operation (A), in some implementations the user 204 can provide both a query image and a natural language query to the user device 202. In these instances, the query engine front-end 220 can transmit the data identifying the entities together with the natural language query to the knowledge engine 260. For example, the query engine front-end 220 can transmit data identifying the entities "The Gherkin," "Norman foster," "Standard Life," and "City of London," together with the natural language query "location" or "architecture."

The knowledge engine 260 can receive the data identifying the entities, and can identify one or more candidate search queries that are pre-associated with the one or more entities. In some implementations, the knowledge engine 260 can identify candidate search queries related to identified entities based on accessing a database or server that maintains candidate search queries relating to entities, e.g., a pre-computed query map. For example, the knowledge engine 260 can receive information that identifies the entity "The Gherkin," and the knowledge engine can access the database or server to identify candidate search queries that are associated with the entity "The Gherkin," such as "How tall is The Gherkin" or "What style of architecture is the Gherkin?" In some implementations, the database or server accessed by the knowledge engine 260 can be a database or server that is associated with the knowledge engine 260, e.g., as a part of the knowledge engine 260, or the knowledge engine 260 can access the database or server, e.g., over one or more networks. The database or server that maintains candidate search queries related to entities, e.g., a pre-computed query map, may include candidate search queries in differing languages. In such cases, the knowledge engine may be configured to identify candidate search queries that are associated with a given entity in a language that matches the user's language, e.g., as indicated by the user device or by a natural language query provided with a query image.

The database or server may include a trained or hardcoded statistical mapping of related entities, e.g., based on search query logs, and can store candidate search queries that relate to various entities. The knowledge engine 260 can obtain or identify candidate search queries that are related to the one or more entities associated with the user-input query search image using the database or server. For example, the knowledge engine 260 can identify one or more candidate search queries that are related to the building "The Gherkin" at the database or server. The knowledge engine 260 can identify the related candidate search queries based on performing a search of the database or server for candidate search queries that are related to "The Gherkin" or by performing a search for candidate search queries that are related to an entity identifier that uniquely identifies "The Gherkin." In other implementations, the knowledge engine 250 can identify the related candidate search queries by accessing entries at the database or server that are distinctly related to the identified entity. For example, the database or server may maintain a folder or other data store that includes candidate search queries related to "The Gherkin," and the knowledge engine 260 can obtain or identify the candidate search queries related to "The Gherkin."

As described above with reference to operation (A), in some implementations the user 204 can provide both a query image and a natural language query to the user device 202. In such cases, the knowledge engine 260 can identify candidate search queries that are pre-associated with the one or more entities using the submitted natural language query. In some implementations the knowledge engine 260 may identify candidate search queries that are pre-associated with the one or more entities and/or the submitted natural language query. For example, the knowledge engine 260 may identify candidate search queries that are pre-associated with the entity "The Gherkin" and the natural language query "location," such as the candidate search query "directions to The Gherkin" or "location of The Gherkin."

The knowledge engine 260 can also generate respective relevance scores for each of the one or more candidate search queries that are pre-associated with the one or more entities. For example, the knowledge engine 260 may determine whether a context of the received user-input query image matches a candidate search query, and based on the determined match, generate a respective relevance score for the candidate search query. Determining whether a context of a received user-input query image may include determining whether the candidate search query matches the user's intent, e.g., using a natural language query submitted by the user together with the query image, or determining whether the user-input query image has an associated location that matches the candidate search query. For example, may determine that the received photograph 100 of The Gherkin was taken near in the vicinity of The Gherkin. In such an example, the knowledge engine 260 may generate higher respective relevance scores for candidate search queries that are related to The City of London. In another example, the knowledge engine 260 may determine that the received photograph 100 of The Gherkin was taken within the home of the user. In such an example the knowledge engine 260 may generate higher respective relevance scores for candidate search queries that are related to properties or features of The Gherkin.

In other examples, the knowledge engine 260 may generate respective relevance scores for each of the one or more candidate search queries by generating a search results page using the candidate search query and analyzing the generated search results page to determine a measure indicative of how interesting and useful the search results page is. Based on the determined measure, the system may generate a respective relevance score for the candidate search query. For example, a candidate search query that generates a search results page that includes many visual elements may be assigned a higher relevance score than a candidate search query that generates a search results page that includes less or no visual elements.

In other examples, the knowledge engine 260 may generate respective relevance scores for each of the one or more candidate search queries by determining a popularity of the candidate search query. For example, the knowledge engine 260 may generate a higher relevance score for a candidate search query that was issued more times than another candidate search query that was issued less times.

In further examples, the knowledge engine 260 may generate respective relevance scores for each of the one or more candidate search queries by determining a user activity associated with the received image. For example, the knowledge engine 260 may determine that a user's current activity is sightseeing based on the current and recent location of the user or recently submitted search queries relating to sightseeing. In further examples the knowledge engine 260 may determine a user's current activity using other means, such as by accessing activity information on a user's calendar. In such an example, the knowledge engine 260 may determine that the user is expected to go sightseeing in London at the weekend and upon receiving a query image of The Gherkin, the knowledge engine 260 may generate higher respective relevance scores for candidate search queries that are related to famous landmarks in London.

In some implementations the user 204 can provide both a query image and a natural language query to the user device 202. In such cases, the knowledge engine 260 may generate respective relevance scores for each of the one or more candidate search queries based on the natural language query. For example, the knowledge engine 260 may score candidate search queries relating to the natural language query higher than candidate search queries that are not related to the natural language query, e.g., based on the natural language query "architecture," the knowledge engine 260 may score the candidate search queries "What style of architecture is The Gherkin" or "who designed The Gherkin" higher than the candidate search queries "How tall is The Gherkin" or "Who occupies The Gherkin?"

In some instances relevance scores may be assigned to the one or more candidate search queries by another system or assigned to the candidate search queries by a person, e.g., a moderator or user of the system 200.

Based on identifying the one or more candidate search queries that are pre-associated with the one or more entities, the knowledge engine 260 can transmit data that identifies the candidate search queries and their respective relevance scores to the query engine front-end 220 during operation (G). For example, the knowledge engine 260 can obtain and/or identify one or more candidate search queries that are related to the building "The Gherkin," and can transmit data to the query engine front-end 220 that includes or identifies the candidate search queries "How tall is The Gherkin?" or "What style of architecture is The Gherkin?" The knowledge engine 260 can transmit the data that includes or identifies the candidate search queries to the query engine front-end 220 over one or more networks, or over one or more other wired or wireless connections.

The query engine front-end 220 can receive the data that includes or identifies the one or more candidate search queries and their respective relevance scores from the knowledge engine 260 and can select one or more representative search queries from the one or more candidate search queries based at least on the relevance scores, e.g., by ranking the one or more candidate search queries and selecting a number of highest scoring search queries as representative search queries. For example, the query engine front-end may receive data that includes or identifies the candidate search queries "How tall is The Gherkin?" with relevance score 0.7 and "What style of architecture is The Gherkin?" with relevance score 0.8. Based on the relevance scores, the query engine front-end may select the candidate search query "What style of architecture is The Gherkin?" In some implementations the query engine front-end may select one or more representative search queries from the one or more candidate search queries based on the relevance scores and the label scores received from the image annotator 240, e.g., by aggregating the relevance scores and label scores using a ranking function or classifier.

During operation (H), the query engine front-end 220 can transmit data encoding the one or more representative search queries to the user device 202. In some implementations, the query engine front-end 220 can transmit data encoding the one or more representative search queries and data relating to the presentation of a search results page associated with one or more of the representative search queries, e.g., a search results page associated with the highest scoring representative search query, to the user device 202 over one or more networks, or over one or more other wired or wireless connections.

The user device 202 can receive the data encoding the one or more representative search queries from the query engine front-end 220, and provide for output to the user 204 the one or more representative search queries and, optionally, a search results page associated with the one or more representative search queries. For example, the user device 202 may receive data encoding the ranked representative search queries "What style of architecture is The Gherkin?" "How tall is The Gherkin?" or "Who occupies The Gherkin?" and provide for output to the user 204 the one or more representative search queries and a search results page associated with the highest ranked representative search query "What style of architecture is The Gherkin?", as depicted in FIG. 1 above.

Figure 3:
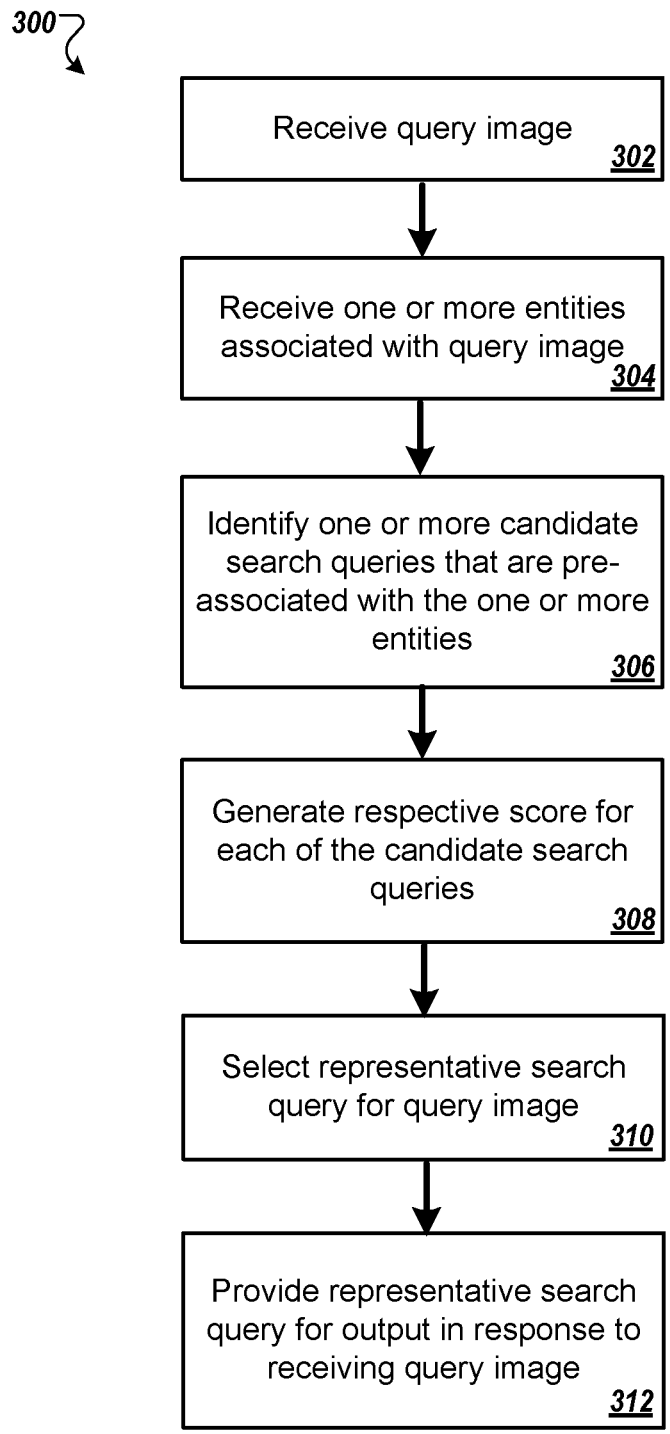
FIG. 3 depicts a flowchart of an example process for providing a representative search query for output in response to receiving a query image.

FIG. 3 presents an example process 300 for providing a search query in response to receiving a search query image. For example, the process 300 can be performed by the system 200 in response to receiving a search query image by a user 204 at user device 202.

The system receives a query image (step 302). The query image may be a search query that is in the form of an image, for example a photo from a user's surroundings. In some implementations the system may also receive a natural language query together with the query image.

The system receives one or more entities that are associated with the query image (step 304). In some implementations the system receives one or more entities that are associated with the query image by first obtaining one or more query image labels, e.g., visual recognition results, for the query image. For example, the system may obtain query image labels for the query image from one or more back ends. Some back ends may return certain classes of fine grained results, i.e., the one or more query image labels may include fine-grained image labels such as labels that label specific landmarks, book covers or posters that are present in a query image. Other back ends may return coarse-grained results, i.e., the one or more query image labels may include coarse-grained image labels such as labels that label objects, e.g., a building, book or lake, that are present in the query image. In other examples, some back ends may return OCR or textual results.

For one or more of the obtained query image labels, the system may then identify one or more entities that are pre-associated with the one or more query image labels, e.g., using a knowledge graph. For example, as described above, the system may collect query image labels from back ends that return fine-grained image labels. Such fine-grained image labels may be pre-associated with a specific entity in a knowledge graph, e.g., the entity "The Gherkin," or "Eiffel Tower."

In some implementations the system may further generate a respective label score for each of the obtained query image labels. The respective label scores for the query image labels may be based at least on a topicality of the query image label, e.g., how important a query image label is to the query image as a whole. For example, the received query image may be a photo of a hand holding a bottle of a branded soft drink. The obtained query image labels may include an image label labeling the bottle and an image label labeling the hand that is holding the bottle. Based on topicality, the label score for the hand may be lower than the label score for the bottle, since the hand may be less central to the image and/or cover a smaller area of the query image than the bottle.

In some cases the respective label scores for the query image labels may be based at least on how specific the label is.

In further cases a respective label score for a query image label may be based at least on a reliability of a backend by which the query image label was obtained from. For example, a query image label obtained from a back end that has a reputation for accurately analyzing images to identify image labels may be assigned a higher label score than a query image label obtained from a back end with a reputation for inaccurately analyzing images to identify image labels.

The system identifies, for one or more of the entities, one or more candidate search queries that are pre-associated with the one or more entities (step 306). For example, the system may access a pre-computed query map to identify one or more candidate search queries for a given entity. The pre-computed query map may be a trained or hardcoded statistical mapping of related entities, e.g., based on search query logs, and may be used to identify both entities and candidate search queries. For example, the query image may include a photo of a basketball, and the entity "basketball" may be received as an entity associated with the query image. The entity "basketball" may be considered to be related to the "NBA," so both the entity "basketball" and candidate search query "NBA" may be found in the pre-computed query map.

The system generates a respective relevance score for each of the candidate search queries (step 308). In some implementations generating a respective relevance score for each of the candidate search queries may include, for each candidate search query, determining whether a context of the query image matches the candidate search query, and based on the determined match, generating a respective relevance score for the candidate search query. For example, for a given candidate search query, the system may determine whether the type of the candidate search query matches the user's intent.

In some implementations determining whether the context of the query image matches the candidate search query may include determining whether the query image has an associated location that matches the candidate search query.

In some cases the system may determine a location that corresponds to a location where the query image was taken or produced. For example, the system may determine that a received photograph of a coat was taken within a shopping mall. In such an example, the system may generate higher respective relevance scores for candidate search queries that are related to shopping or commercial results. In another example, the system may determine that the received photograph of the coat was taken within the home of the user. In such an example the system may generate higher respective relevance scores for candidate search queries that are related to the weather, such as "do I need my coat today?"

In other cases the system may determine a location that corresponds to a current location of the user device. For example, the system may determine that an image of flowers is received in a specific town or neighborhood. In such an example, the system may generate higher respective relevance scores for candidate search queries that are related to nearby florists or gardening services.

In some implementations, generating a respective relevance score for each of the candidate search queries may include, for each candidate search query, generating a search results page using the candidate search query and analyzing the generated search results page to determine a measure indicative of how interesting and useful the search results page is. Based on the determined measure, the system may generate a respective relevance score for the candidate search query. For example, the measure indicative of how interesting and useful the search results page is may depend on visual elements shown in the search results page. The system may generate higher respective relevance scores for candidate search queries that produce search results pages with oneboxes or webanswer cards than candidate search queries that produce search results pages with no oneboxes or webanswer cards.

In some implementations, generating a respective relevance score for each of the candidate search queries may include, for each candidate search query, determining a popularity of the candidate search query and based on the determined popularity, generating a respective relevance score for the candidate search query. For example, the system may generate a higher relevance score for a candidate search query that was issued more times than another candidate search query that was issued less times.

In further implementations, generating a respective relevance score for each of the candidate search queries may include determining a user activity associated with the received image. For example, the system may determine that a user's current activity is shopping based on the location of the user or recently submitted search queries relating to shopping. In further examples the system may determine a user's current activity using other means, such as by accessing activity information on a user's calendar. In such an example, the system may determine that the user is expected to go hiking at the weekend and upon receiving a query image of a pair of hiking boots, the system may generate higher respective relevance scores for candidate search queries that are related to nearby hiking trails.

As described above with reference to step 302, in some implementations the system receives a natural language query together with the query image. In such cases, generating a respective relevance score for each of the candidate search queries may include generating a respective relevance score for each of the candidate search queries based at least on the received natural query. For example, the query image may include an image of the "LA Lakers" logo and the natural language query may include the text "buy clothing." The system may then generate respective relevance scores for the candidate search queries "LA Lakers jersey" or "buy LA Lakers jersey" that are higher than relevance scores for candidate search queries that are not related to the text "buy clothing."

The system selects, as a representative search query for the query image, a particular candidate search query based at least on the generated respective relevance scores (step 310). In some implementations selecting a particular candidate search query based at least on the candidate query scores includes selecting a particular candidate search query based at least on both the candidate query scores and the label scores described above with reference to step 304.

For example, in some implementations selecting a particular candidate search query based at least on the candidate query scores and the label scores may include determining an aggregate score between each label score and associated candidate query score. The system may rank the determined aggregate scores, e.g., using a ranking function or classifier, and select a particular candidate search query that corresponds to a highest ranked score.

In other implementations, selecting a particular candidate search query based at least on the candidate query scores may include ranking the relevance scores for the candidate search queries, e.g., using a ranking function or classifier, and selecting a particular candidate search query that corresponds to a highest ranked score.

The system provides the representative search query for output in response to receiving the query image (step 312). In some implementations the system further generates a search results page using the representative search query and provides the generated search results page for output in response to receiving the query image.

In some cases, the system may also provide a predetermined number of candidate search queries that correspond to the predetermined number of highest ranked scores for output in response to receiving the query image. For example, the system may provide the top 10 scoring candidate search queries for output in response to receiving the query image, and allow the user to select a search query of their choice. In such cases, the system may provide a respective search results page associated with each of the predetermined number of candidate search queries for output in response to receiving the query image.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims.

For example, the actions recited in the claims may be performed in a different order and still achieve desirable results.

What is claimed is:

1. A computing system comprising:
one or more processors;
one or more non-transitory computer readable media that collectively store instructions that, when executed by the one or more processors, cause the computing system to perform operations, the operations comprising:
obtaining, a data encoding, wherein the data encoding comprises an encoding of a query image, wherein the query image comprises one or more image features;
processing the query image with an image annotator to identify one or more query image labels, wherein the one or more query image labels label one or more objects in the query image and wherein the one or more query image labels comprise coarse grained image labels, wherein the coarse grained image labels label one or more classes of objects;
determining one or more entities associated with the one or more query image labels, wherein the one or more entities comprise specific instances of the one or more classes of objects;
determining a plurality of candidate search queries based at least in part on the one or more entities;
determining a context associated with the query image;
determining a representative search query of the plurality of candidate search queries based at least in part on the context associated the query image;
obtaining a search results page associated with the representative search query; and
providing the search results page for display.

2. The computing system of claim 1, wherein the operations further comprise:
generating a respective relevance score for each of the plurality of candidate search queries comprises, for each candidate search query:
determining a popularity of the candidate search query; and
based on the determined popularity, generating a respective relevance score for the candidate search query;
wherein the representative search query is determined based at least in part on the one or more entities, the context, and the relevance scores.

3. The computing system of claim 1, wherein determining the representative search query of the plurality of candidate search queries based at least in part on the context associated the query image comprises:
identifying, for one or more of the entities, one or more candidate search queries, wherein the one or more candidate search queries are textual search queries and wherein the one or more candidate search queries are different than one or more terms associated with the one or more entities.

4. The computing system of claim 1, wherein determining the representative search query of the plurality of candidate search queries based at least in part on the context associated the query image comprises:
generating a respective relevance score for each of the candidate search queries; and
selecting the representative search query for the query image based at least on the generated respective relevance scores.

5. The computing system of claim 1, wherein the operations further comprise:
generating a respective relevance score for each of the candidate search queries comprises, for each candidate search query:
generating a search results page using the candidate search query;
analyzing the generated search results page to determine a measure indicative of how interesting and useful the search results page is; and
based on the determined measure, generating a respective relevance score for the candidate search query.

6. The computing system of claim 1, wherein the one or more query image labels tag the one or more image features in the query image.

7. The computing system of claim 1, wherein the one or more image features comprise one or more coarse-grained features.

8. The computing system of claim 1, wherein the one or more image features comprise one or more fine-grained features.

9. The computing system of claim 1, wherein the search results page comprises a plurality of search results responsive to the representative search query.

10. The computing system of claim 1, wherein the query image comprises an image found on a website accessed by a user device.

11. The computing system of claim 1, wherein the search results page comprises a knowledge panel, wherein the knowledge panel comprises general information associated with the one or more entities associated with the one or more query image labels.

12. A computer-implemented method, the method comprising:
obtaining, a data encoding, wherein the data encoding comprises an encoding of by a computing system comprising one or more processors, a query image, wherein the query image comprises one or more image features;
processing, by the computing system, the query image with an image annotator to identify one or more query image labels, wherein the one or more query image labels label one or more objects in the query image and wherein the one or more query image labels comprise coarse grained image labels, wherein the coarse grained image labels label one or more classes of objects;
determining, by the computing system, one or more entities associated with the one or more query image labels, wherein the one or more entities comprise specific instances of the one or more classes of objects;
determining, by the computing system, a plurality of candidate search queries based at least in part on the one or more entities;
determining, by the computing system, a context associated with the query image;
determining, by the computing system, a representative search query of the plurality of candidate search queries based at least in part on the context associated the query image;
obtaining, by the computing system, a search results page associated with the representative search query; and
providing, by the computing system, the search results page for display.

13. The method of claim 12, further comprising:
receiving a natural language query; and
generating a respective relevance score for each of the candidate search queries based at least on the received natural language query.

14. The method of claim 12, further comprising:
providing, by the computing system, the one or more entities for display.

15. The method of claim 12, wherein determining, by the computing system, the context associated with the query image comprises:
determining, by the computing system, at least one of an intent of a user or a location of the user.

16. The method of claim 12, wherein the representative search query is determined based at least in part on at least one of an intent of a user, a determined popularity of a particular candidate search query, an association with one or more relevant search result pages, or an association with a received natural language query.

17. One or more non-transitory computer-readable media that collectively store instructions that, when executed by one or more computing devices, cause the one or more computing devices to perform operations, the operations comprising:
obtaining a data encoding, wherein the data encoding comprises an encoding of a query image, wherein the query image comprises one or more image features;
processing the query image with an image annotator to identify one or more query image labels, wherein the one or more query image labels label one or more objects in the query image and wherein the one or more query image labels comprise coarse grained image labels, wherein the coarse grained image labels label one or more classes of objects;
determining one or more entities associated with the one or more query image labels, wherein the one or more entities comprise specific instances of the one or more classes of objects;
determining a plurality of candidate search queries based at least in part on the one or more entities;
determining a context associated with the query image;
determining a representative search query of the plurality of candidate search queries based at least in part on the context associated the query image;
obtaining a search results page associated with the representative search query; and
providing the search results page for display.

18. The one or more non-transitory computer-readable media of claim 17, wherein the search results page comprises one or more images and one or more textual search results responsive to the representative search query.

19. The one or more non-transitory computer-readable media of claim 17, wherein determining the plurality of candidate search queries based at least in part on the one or more entities comprises determining the plurality of candidate search queries with a knowledge engine, wherein the knowledge engine is configured to identify candidate search queries that are associated with the one or more entity in a language that matches a user language.

20. The one or more non-transitory computer-readable media of claim 19, wherein the user language is indicated by a user device associated with the query image.

* * * * *